Jan. 20, 1953           H. GELB           2,625,851
CAMERA LENS BOARD AND MEANS FOR CONTROLLING THE SAME
Filed April 29, 1949           3 Sheets-Sheet 1
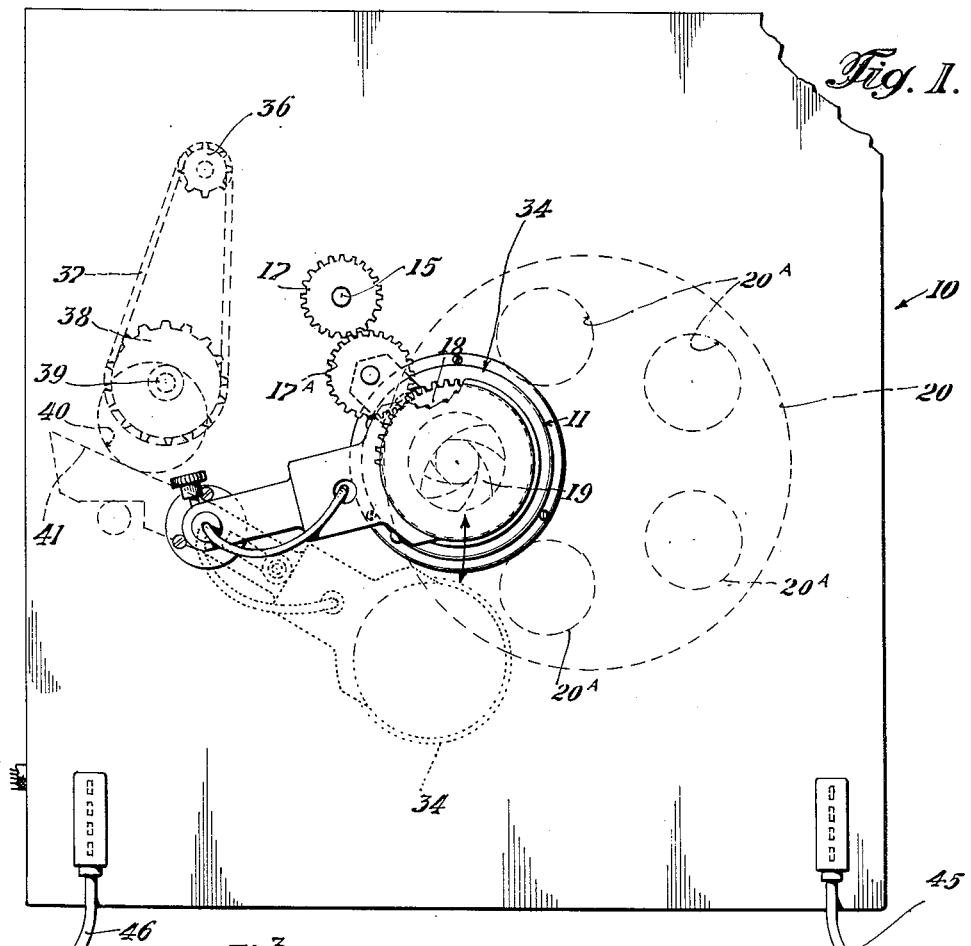
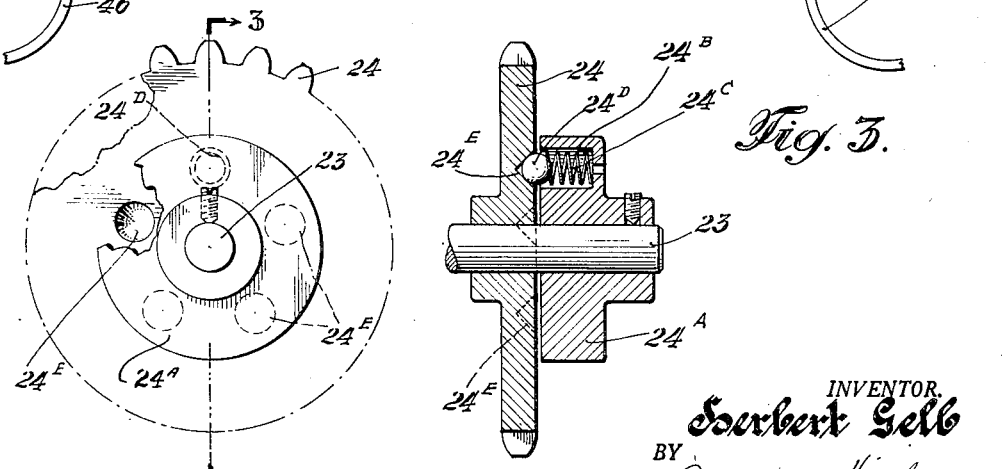
INVENTOR
Herbert Gelb
BY
Achenbach & Hirschman
Attorneys Jan. 20, 1953 H. GELB 2,625,851
CAMERA LENS BOARD AND MEANS FOR CONTROLLING THE SAME
Filed April 29, 1949 3 Sheets-Sheet 2

INVENTOR.
BY Herbert Gelb
Lackenbach & Hirschman
Attorneys

Jan. 20, 1953 H. GELB 2,625,851
CAMERA LENS BOARD AND MEANS FOR CONTROLLING THE SAME
Filed April 29, 1949 3 Sheets-Sheet 3

INVENTOR.
Herbert Gelb
BY
Rackenbach & Hirschmann
Attorneys

Patented Jan. 20, 1953

2,625,851

UNITED STATES PATENT OFFICE 2,625,851

CAMERA LENS BOARD AND MEANS FOR CONTROLLING THE SAME

Herbert Gelb, New York, N. Y., assignor to Joseph Gelb Company, New York, N. Y.

Application April 29, 1949, Serial No. 90,312

3 Claims. (Cl. 88—24)

The invention relates to a camera lens board and means for controlling the same remotely.

The general object of the invention is to provide a lens board of novel construction for a large stationary camera of the type usually employed in the printing arts in connection with photoengraving and for other purposes.

The lens board of the present invention is particularly suitable for use with a large, stationary, suspended camera of the type described and claimed in my copending application for United States patent bearing Serial Number 90,311 and filed April 29, 1949, now Patent No. 2,585,927, of February 19, 1952.

The present invention contemplates a lens board adapted to seal the front end of the bellows of a large stationary camera and to support the lenses, shutter, diaphragm, filter, compensating glass, flashlight, and means for operating these members.

The lens board of the present invention is of particular use in connection with photographic work of lithographers and other plate makers in the printing arts, and is especially adapted for color process work and halftone platemaking.

In a large stationary camera of the type described it is desirable that the focal adjustment, actuation of the shutter and variation of the aperture thereof, presentation and withdrawal of the flashlight and energization thereof, as well as energization of the floodlights of the camera, all be remotely controllable by cooperating powered means responsive to manual selection on a keyboard or the like prior to making an exposure.

Thus the various accessories mounted on the lens board in the invention are arranged so that they may be controlled remotely, as by switches mounted at any convenient place distant from the lens board itself.

These and further objects of the invention will be more fully understood from the following description and from the drawing in which one embodiment of the invention is illustrated.

In the drawings:

Fig. 1 is a front elevational view of the lens board.

Fig. 2 is an elevational view of a special means for causing certain shafts connected with the lens board to stop at a desired angular position with overthrow or backlash; and Fig. 3 is the section 3—3 of Fig. 2.

Figure 4:
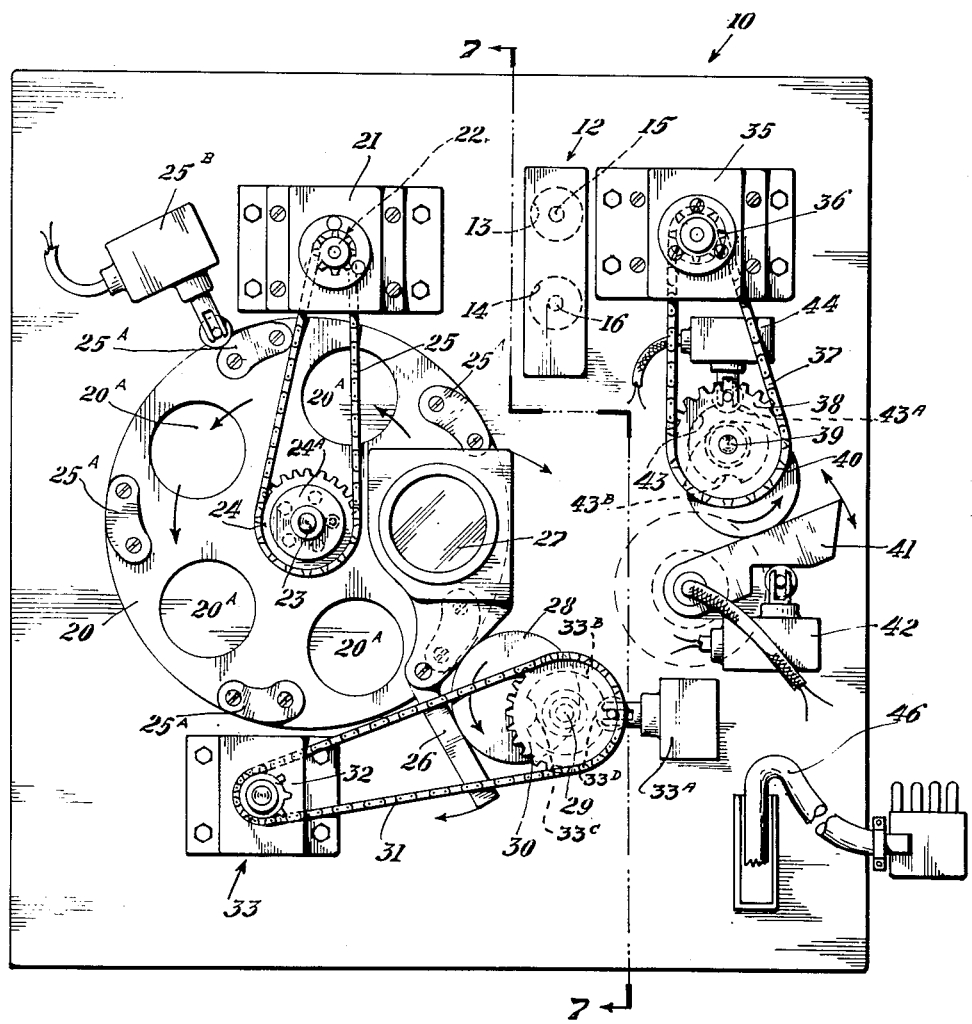
Fig. 4 is a rear elevational view of the lens board.

The lens board itself is preferably a rectangular sheet of light metal such as "Duralumin," adapted to be fitted within and suitably secured to the usual rectangular frame at the front end of the bellows of the camera. Such a frame is not illustrated in the drawing as it is well known in the art.

In the following description that surface of the board seen from within the bellows of the camera is referred to as the rear. Fig. 1 is therefore a front elevation, and Fig. 4 a rear elevation.

Figure 5:
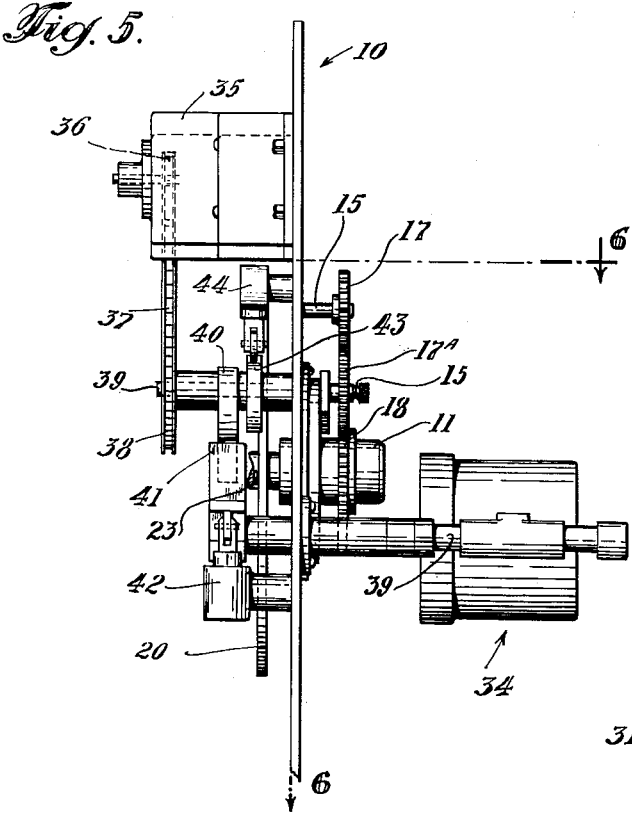
Fig. 5 is a fragmentary right side elevation of the same.

Fig. 5 is a fragmentary right hand side elevation.

Figure 7:
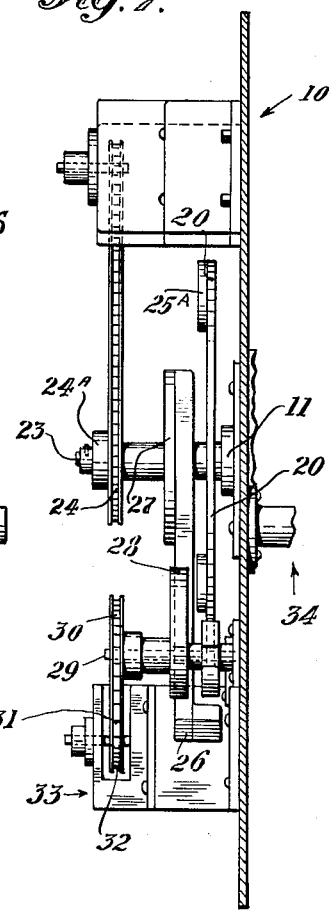
Fig. 7 is the vertical section 7—7 of Fig. 4.
Figure 6:
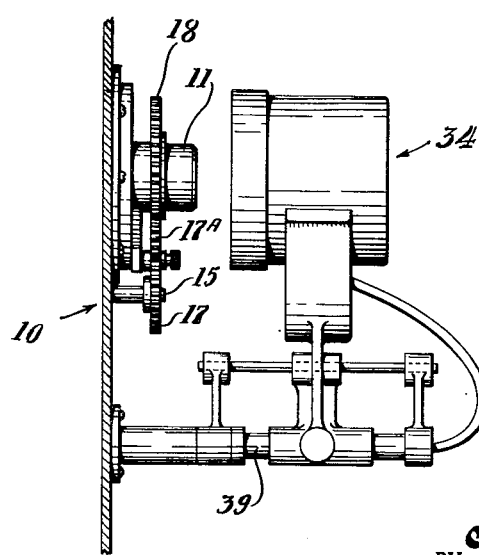
Fig. 6 is the horizontal section 6—6 of Fig. 5.

Figs. 6 and 7 are respectively the horizontal section 5—5 of Fig. 6, and the vertical section 7—7 of Fig. 4.

The board is centrally provided with a circular aperture. The usual structure mounting the lens, diaphragm, and shutter is rigidly mounted on the front of the lens board in registration with this aperture.

A flashlight is pivotally mounted on the front side of the lens board and is adapted to be swung, when desired, into coaxiality with the lens.

A filter which, having five like circular apertures equally spaced around its center, and each covered by a Celluloid or other transparent plastic of a different color, is pivotally mounted on the rear of the lens board so that rotation of the wheel brings these apertures into register with the lens in seriatim.

A compensating glass is also pivotally mounted on the rear side of the board and is adapted to be swung into coaxiality with the lens when a half-tone screen is not to be employed during an exposure to compensate for the thickness of a removed half-tone screen.

Separate motors mounted on the lens board are provided to operate the lens barrel, the shutter, the flashlight, the filter wheel, and the compensating glass.

The base of the lens board, i. e., the actual sheet of light metal mentioned above, adapted to be fitted within and suitably secured to the usual rectangular bellows frame at the front of the camera, is designated 10.

The central aperture of the lens board is nowhere illustrated but will be fully understood by workers in the photographic art.

The usual structure mounting the lens, diaphragm, and shutter may comprise a lens barrel 11. The central aperture of the base 10 may be internally threaded to receive an externally threaded end of the barrel; but it is preferred to mount a perforate adapter on the front of the base in register with the aperture and to mount the barrel upon the adapter. Thus various units comprising a barrel and adapter may be selectively used in connection with the same base.

*Filter and its control*

Pivotally mounted on the rear side of the lens board is a filter wheel 20 having equally spaced about its center five like circular apertures 20A, each covered by a Celluloid or other transparent plastic of a different color, so that rotation of the wheel brings these apertures into register with the lens in seriatim. See Fig. 4.

A motor 21 is mounted on the rear side of the lens board. On its shaft is a sprocket 22. The shaft 23 of the filter wheel is provided with a sprocket 24. A chain 25 connects the two sprockets and thereby transmits the power of motor 21 to the filter wheel 20.

Spaced at angular positions 72° apart around the periphery of the filter wheel are five cams 25A. Fixed to the rear surface of the lens board, is a switch 25B having a plunger with a roller at its external end adapted to be engaged in seriatim by said cams. This switch operates to break the circuit of motor 21 and to stop the rotary motion of the filter wheel.

The filter wheel 20 and the sprocket 24 are rigidly attached to each other, but both members are rotatably mounted on shaft 23, which is so mounted on the lens board that it may not rotate. On the rear end of shaft 23 is mounted a collar 24A having therein a counterbore 24B containing a compression spring 24C and a ball 24D. The collar 24A is locked against rotation (see Fig. 3). The rear surface of sprocket 24 is provided with five conical recesses 24E set at equal angular intervals around the center thereof and so spaced from the center of the sprocket that each time one such recess is brought into register with said ball the compression spring forces the ball thereinto.

The spacements of the cams around the periphery of the filter wheel with relationship to the spacements of the conical sockets of the sprocket 24 are such that motor 21 is deenergized substantially at the time any one of the conical recesses is brought into register with the above mentioned ball, so that in consequence the overthrow of the sprocket 24 is prevented by the advancement of the ball and back lash is also prevented.

This, it will be obvious, is for the purpose of assuring proper registration between any one of the five apertures of the filter wheel with the lens itself.

As the present camera is intended for use in color process work one of the apertures is covered with a clear plastic filter and the other four apertures are covered respectively with a primary red, a primary yellow, a primary green, and a primary blue filter.

As is well known in the art where the camera is provided with spaced means for photoprinting half-tone images the thickness of the sheet of glass upon which the half-tone lines are etched must be taken into account when a negative is being prepared for a line cut. For this reason a glass target equal in thickness to the halftone screen is provided and is adapted to be brought into register with any one of the filter targets and the lens when the halftone screen is not to be used so that the refraction of the projected light will be alike in both cases.

Pivotally mounted on the rear side of the lens board is a bellcrank 26 carrying at one end a compensating glass 27. The other end of the bellcrank engages a cam 28 eccentrically mounted on a shaft 29 which is journalled on the lens board and on the rear end of which is mounted a sprocket 30 which is connected by a chain 31 with another sprocket 32 mounted on the shaft of a motor 33 secured to the rear surface of the lens board.

The configuration of cam 28 is such that revolution thereof causes the bellcrank to oscillate so as to swing the compensating glass into and out of register with the lens.

Mounted on the rear of the lens board is a switch 33A, having a plunger with a roller at its external end. Mounted and keyed on shaft 29 between cam 28 and sprocket 30 (see Fig. 4) is a disk 33B having two diametrically opposed recesses 33C and 33D in its periphery. The roller of switch 33A engages the periphery of disk 33B. The switch, which may operate to break the circuit of motor 33 and to stop movement of cam 28, the bellcrank 26, and the compensating glass 27, is actuated when one or the other of recesses 33C and 33D is brought into register with the roller, and the roller may enter the recess, as shown in Fig. 4. Thus the bellcrank is automatically brought to rest with the compensating glass either in register with the lens, as in Fig. 4, or in a position wherein it is altogether out of the path of light rays passing through the lens.

Pivotally mounted on the front side of the lens board is a flashlight 34. Mounted on the upper right hand side on the rear of the lens board is a motor 35 having mounted on its shaft a sprocket 36 which is connected by means of a chain 37 with another sprocket 38 mounted on a shaft 39 journaled in the board. Rigidly mounted on shaft 39 is a cam 40, similar to cam 28, above mentioned, and engaging a lever 41 rigidly attached to the pivotal mount of the flashlight. Rotation of cam 40 effects oscillation of lever 41. Beneath the cam 40 is a switch 42 which is operated in response to oscillation of the lever 41.

Mounted and keyed on shaft 39 between cam 40 and sprocket 38 (see Fig. 4) is a disk 43, similar to disk 33B, abovementioned, and having two diametrically opposed recesses 43A and 43B in its periphery. Mounted on the rear of the lens board is a switch 44 having a plunger with a roller at its external end. The roller of this switch engages the periphery of disk 43. The switch, which may operate to break the circuit of motor 35 and to stop movement of lever 41, the pivotal mount of the flashlight, and the flashlight itself, is actuated when one or the other of the recesses 43A and 43B is brought into register with the roller, and the roller may enter the recess, as shown in Fig. 4. Thus the structure comprising the flashlight 34, its pivotal mount, and lever 41 is automatically brought to rest with the flashlight either in register with the lens, as in Fig. 1, or in a position wherein it is altogether out of the light path.

The flashlight is shown in Fig. 1 to be in register with the lens. This condition is assumed to obtain in Fig. 4. Thus switch 42 is assumed to be closed. This switch may control energization of the flashlight.

I claim:

1. A lens board; a lens mounted thereon; a flashlight; a bellcrank pivotally mounted on said lens board and having said flashlight mounted on one leg of said bellcrank, said bellcrank being so mounted that oscillation thereof on its pivotal axis moves said flashlight into and out of register with said lens; a shaft journaled on said lens board; an eccentric mounted on said shaft and engaging the other leg of said bellcrank, said eccentric rotatably effecting oscillation of said bellcrank; a motor for rotating said eccentric; a switch for stopping said motor; a cam mounted on said shaft for actuating said switch once each half revolution of said shaft; and another switch for turning said flashlight off and on, said last named switch being actuated by said other leg of said bellcrank.

2. A lens board; a lens mounted thereon; an optical device; a bellcrank pivotally mounted on said lens board and having said device mounted on one leg of the bellcrank, said bellcrank being so mounted that oscillation thereof on its pivotal axis moves said device into and out of register with said lens; a shaft journaled on said lens board; an eccentric mounted on said shaft and engaging the other leg of said bellcrank, said eccentric rotatably effecting oscillation of said bellcrank; a motor for rotating said shaft; a switch for stopping said motor; and a cam mounted on said shaft for actuating said switch at particular angular positions of said shaft; and another switch for starting said motor.

3. The combination of claim 2 including means for preventing override of said device in its oscillatory movement.

HERBERT GELB.

REFERENCES CITED

The following references are of record in the file of this patent:

UNITED STATES PATENTS

| Number | Name | Date |
|---|---|---|
| 1,931,512 | Short | Oct. 24, 1933 |
| 2,133,608 | Engelken | Oct. 18, 1938 |
| 2,150,974 | Huebner | Mar. 21, 1939 |
| 2,292,825 | Dilks | Aug. 11, 1942 |
| 2,307,479 | Annick | Jan. 5, 1943 |
| 2,372,910 | Pratt | Apr. 3, 1945 |
| 2,420,023 | Wekeman | May 6, 1947 |
| 2,500,049 | Williams | Mar. 7, 1950 |